United States Patent
Ryu et al.

(10) Patent No.: US 7,855,684 B2
(45) Date of Patent: Dec. 21, 2010

(54) METHOD AND SYSTEM FOR LOCATING SENSOR NODE IN SENSOR NETWORK USING DISTANCE DETERMINING ALGORITHM

(75) Inventors: Jehyok Ryu, Suwon-si (KR); Sun Gi Kim, Seoul (KR); Hyo Hyun Choi, Seoul (KR); Bum Jin Kim, Seoul (KR); Sae Young Ahn, Yongin-si (KR); Sun Shin An, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 54 days.

(21) Appl. No.: 12/270,912

(22) Filed: Nov. 14, 2008

(65) Prior Publication Data
US 2009/0128412 A1    May 21, 2009

(30) Foreign Application Priority Data
Nov. 15, 2007    (KR) ...................... 10-2007-0116816

(51) Int. Cl.
*G01S 3/02*    (2006.01)
(52) U.S. Cl. ........................................ 342/464; 342/451
(58) Field of Classification Search ................. 342/451, 342/464
See application file for complete search history.

(56) References Cited

U.S. PATENT DOCUMENTS

| | | | | |
|---|---|---|---|---|
| 4,209,787 A * | 6/1980 | Freeny, Jr. | | 342/457 |
| 4,864,313 A * | 9/1989 | Konneker | | 342/457 |
| 6,006,096 A * | 12/1999 | Trompower | | 455/456.2 |
| 6,259,406 B1 * | 7/2001 | Sugiura et al. | | 342/457 |
| 6,552,661 B1 * | 4/2003 | Lastinger et al. | | 340/572.1 |
| 7,298,314 B2 * | 11/2007 | Schantz et al. | | 342/125 |
| 7,423,535 B2 * | 9/2008 | Chung et al. | | 340/572.4 |
| 7,576,694 B2 * | 8/2009 | Anjum et al. | | 342/464 |
| 2007/0178911 A1 * | 8/2007 | Baumeister et al. | | 455/456.1 |
| 2009/0186602 A1 * | 7/2009 | Ghosh et al. | | 455/412.1 |

* cited by examiner

*Primary Examiner*—Thomas H Tarcza
*Assistant Examiner*—Cassi Galt
(74) *Attorney, Agent, or Firm*—Cha & Reiter, LLC

(57) ABSTRACT

For a sensor network having reference nodes and sensor nodes, A method and apparatus using a distance determining algorithm for a sensor network having reference nodes and sensor nodes. A distance determining algorithm is executed to determine an adequate distance between reference nodes within a preset error range, and a position location table is created. A sensor node sends a location information request to reference nodes, receives the position location table and location information from the reference nodes, and computes the coordinates of its position. Alternatively, without requesting transmission of the position location table, the sensor node may receive calculated coordinates of its position directly from a reference node.

23 Claims, 12 Drawing Sheets

METHOD AND SYSTEM FOR LOCATING SENSOR NODE IN SENSOR NETWORK USING DISTANCE DETERMINING ALGORITHM

CLAIM OF PRIORITY

This application claims priority to an application entitled "METHOD AND SYSTEM FOR LOCATING SENSOR NODE IN SENSOR NETWORK USING DISTANCE DETERMINING ALGORITHM" filed in the Korean Intellectual Property Office on Nov. 15, 2007 and assigned Serial No. 2007-0116816, the contents of which are incorporated herein by reference in its entirety.

BACKGROUND OF THE INVENTION

1. Field of the Invention

The present invention relates generally to a sensor network and, more particularly, to a sensor node locating method and system to provide location-based services in shadow areas with the help of existing network infrastructure and digital equipment.

2. Description of the Related Art

With rapid advances in information and communication technologies, network infrastructure has been significantly expanded, digital appliances have been popularized in real life, and various services have been created between the network infrastructure and digital appliances. In particular, location-based services are on the rise as important services. Location-based services using location and geographical information have been shown to be valuable in plurality of fields, and are advancing beyond a particular business area to technologies heightening the value of an entire country. Currently, to keep pace with proliferation of various technologies and user demands, there is a growing interest in and a need in the art for position locating or tracking in indoor environments. Further, many location-based services proposed in relation to ubiquitous networks in the future will be provided in indoor environments that are main living spaces for users.

Most existing location-based services have been developed using the Global Positioning System (GPS) for outdoor environments, ignoring shadow areas. Currently, research is underway to provide location-based services in shadow areas with the help of existing massive network infrastructure and digital equipment.

However, there is a need in the art to develop a position-locating scheme using wireless technology for a sensor node in indoor or underground environments, which are shadow areas of macro location-based systems.

SUMMARY OF THE INVENTION

The present invention provides a method and system for locating a sensor node in a sensor network including reference nodes and sensor nodes. For example, a distance determining algorithm is executed for determining an adequate (sufficient) distance between reference nodes within a preset error range. From a plurality of reference nodes arranged according to the determined distance, a sensor node may receive a pre-computed position location table and location information signals with successively varying signal strength, and finds the coordinates of the location of the sensor node. Alternatively, a sensor node, which does not receive a position location table, sends a coordinate request signal to a reference node. The reference nodes calculate the coordinates of the location of the sensor node using a position location table and send the calculated coordinates to the requesting sensor node, which can then be aware of the location.

In accordance with an exemplary embodiment of the present invention, there is provided a position locating system for a sensor network that may include: reference nodes, each being aware of a position thereof (having self-positional information); and a sensor node having a position location table. Each reference node may include: a control unit generating, in response to a location information request signal, location information; and a radio frequency (RF) communication unit receiving a location information request signal and forwarding the received location information request signal to the control unit, controlling transmission power, and sending the generated location information in return. The sensor node includes: a control unit for generating a coordinate request signal, analyzing transmit power levels extracted from location information from reference nodes, and for calculating coordinates of a position of the sensor node using the position location table; and an RF communication unit transmitting the coordinate request signal, and receiving location information and forwarding the location information to the control unit.

In accordance with another exemplary embodiment of the present invention, there is provided a position locating method for a sensor network having reference nodes and at least one sensor node, including: transmitting, by the sensor node, a location information request signal; transmitting, by each of neighbor reference nodes in response to reception of the location information request signal, a position location table, information on a node distance and maximum transmission distances by transmit power levels, and transmitting transmit power data and absolute coordinate data while varying transmission power; and calculating, by the sensor node, a location of the sensor node using the position location table and transmit power levels of the reference nodes.

In an exemplary aspect of the present invention, although the algorithm determining the distance between reference nodes may require a relatively large number of computations, the algorithm can be executed by an external facility such as a personal computer rather than by a node. Hence, the node can be used to reduce energy consumption and computational load. Once the distance between reference nodes and associated error are computed, it is unnecessary to re-compute them unless the reference nodes are moved. Determination of the distance between reference nodes typically occurs before a sensor node is turned on, and is not related to the computational speed of the sensor node. A sensor node can be provided its location thereof by searching/retrieval from a pre-computed table.

BRIEF DESCRIPTION OF THE DRAWINGS

The above features and advantages of the present invention will be more apparent from the following detailed exemplary description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring appreciation of the subject matter of the present invention by a person of ordinary skill in the art.

In the following description, a 'reference node' typically comprises a node that is aware of its own absolute position. Upon reception of a signal requesting location information from a sensor node, the reference node sends location information to the sensor node while varying transmission power. The position of a reference node may be changed or fixed at a particular point according to its characteristics.

A 'sensor node' comprises a node that sends a signal requesting location information to a reference node to identify its relative position.

In the case where a sensor node is placed within an area formed by plural reference nodes, the 'origin node' refers one of the reference nodes having the smallest absolute coordinates (x, y).

Figure 1:
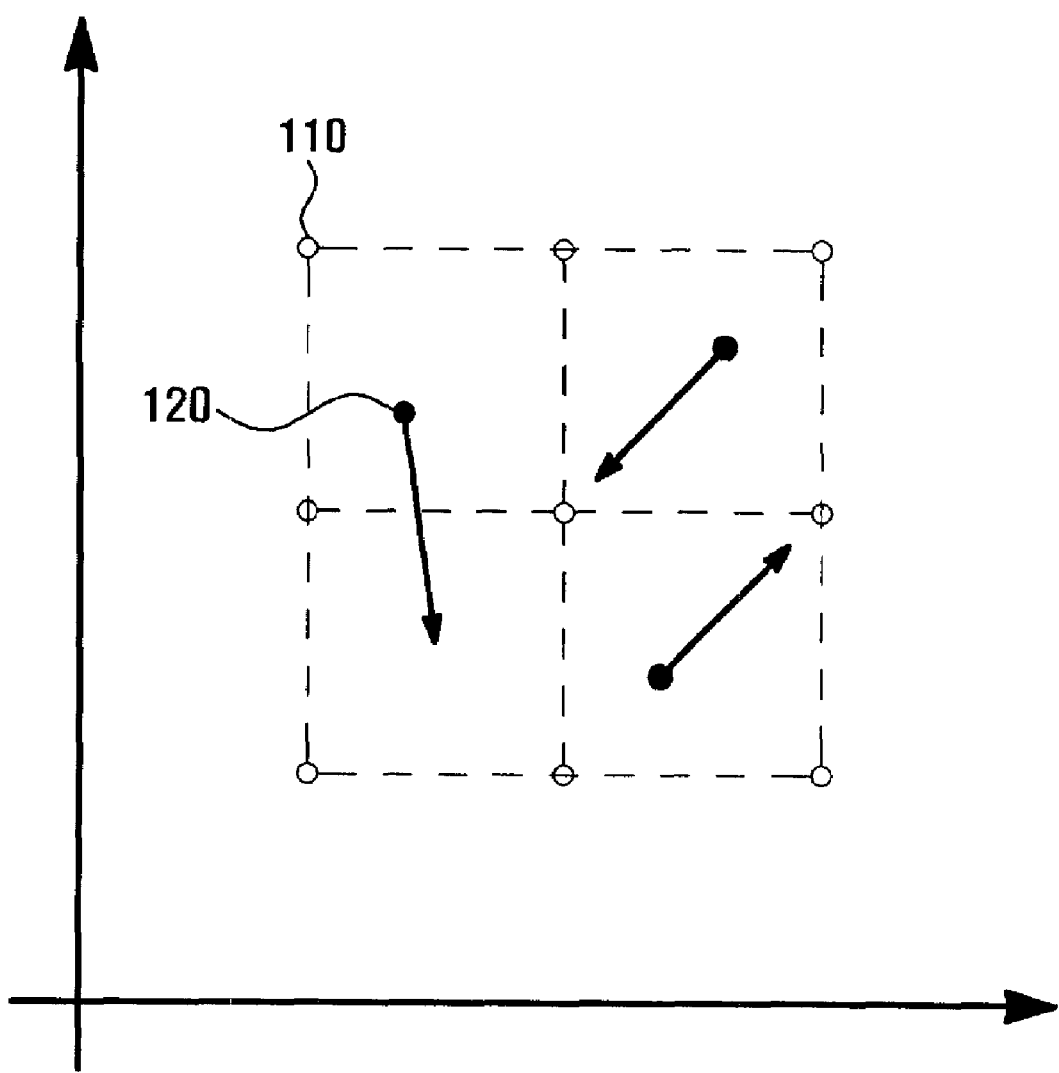
FIG. 1 illustrates a sensor network including reference nodes and a sensor node, in which the sensor node requests location information and the reference nodes provide location information in return.

FIG. 1 illustrates a sensor network including reference nodes 110 and a sensor node 120, in which the sensor node 120 requests location information and the reference nodes 110 provide location information in return.

Referring now to FIG. 1, which illustrates a sensor network including reference nodes 110 and sensor nodes 120, a sensor node 120 sends a location information request signal to reference nodes 110 and then receives signals carrying location information from the reference nodes 110.

The reference nodes 110 are aware of their own absolute positions. Upon reception of a location information request signal from the sensor node 120, the reference nodes 110 send their location information to the sensor node 120 while varying their transmission power. Absolute positions are given by a geographic code system including latitude and longitude. The reference nodes 110 may obtain their own location information using various techniques including but not limited to the use of GPS. In FIG. 1, the reference nodes 110 are arranged at intervals according to the distance computed by a distance determining algorithm of an exemplary embodiment with a maximum error associated with the sensor node 120. The positions of the reference nodes 110 may be changed or fixed at particular points according to their characteristics. For position locating, the reference nodes 110 may be arranged to form, for example, a square, regular triangle, or regular hexagon. In the following description, it is assumed that the reference nodes 110 are arranged to form a square.

The sensor node 120 sends a location information request signal to the reference nodes 110 to identify its relative position. After connecting to the network, the sensor node 120 sends a location information request signal to neighbor reference nodes 110 if necessary. The sensor node 120 receives location information from the reference nodes 110, refers to a pre-computed position location table, and readily identifies its position without additional computation.

Figure 2:
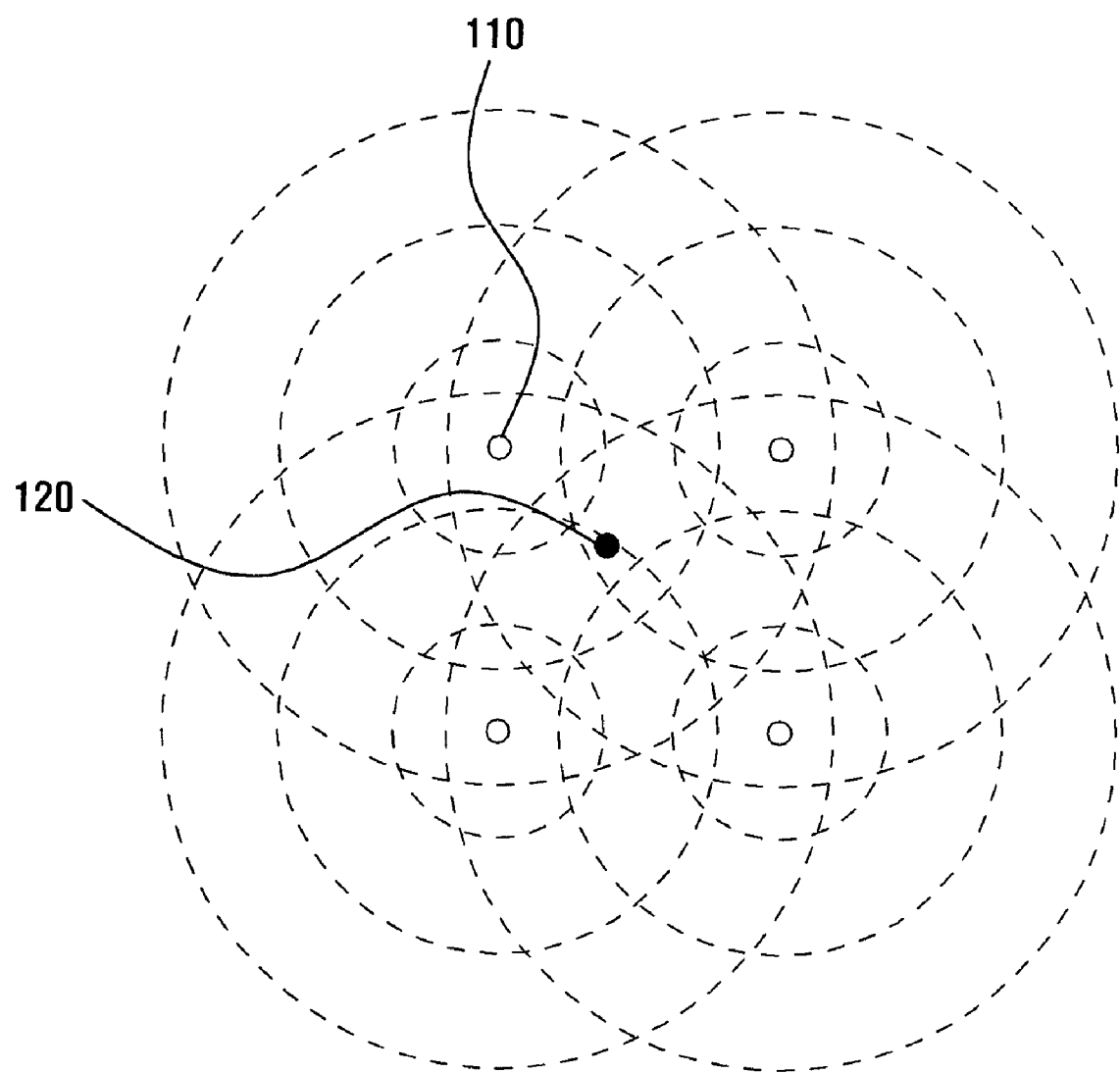
FIG. 2 illustrates regions formed through transmission range control performed by reference nodes sending location information signals while varying transmission power.

FIG. 2 illustrates regions formed through transmission range control performed by reference nodes 110 that send location information signals while varying their transmission power in response to a location information request signal from a sensor node 120.

Upon reception of a location information request signal from a sensor node 120, reference nodes 110 send location information signals to the sensor node 120 while varying transmission power according to their location information. This process is referred to as transmission range control. Transmission ranges of location information signals emitted by a reference node 110 with varying transmit power levels can be represented by donut-shapes as in FIG. 2.

Several commercially available products employ transmission range control, and the CC2420 RF transceiver (Texas Instrument) used in the present invention has eight transmit power levels. Table 1 illustrates maximum transmission distances of the CC2420 RF transceiver according to transmit power levels (obtained through experiments).

TABLE 1

| Transmit power level | Maximum distance (cm) |
|---|---|
| level 1 | 18 |
| level 2 | 80 |
| level 3 | 135 |

TABLE 1-continued

| Transmit power level | Maximum distance (cm) |
|---|---|
| level 4 | 220 |
| level 5 | 290 |
| level 6 | 400 |
| level 7 | 600 |
| level 8 | 750 |

Figure 3:
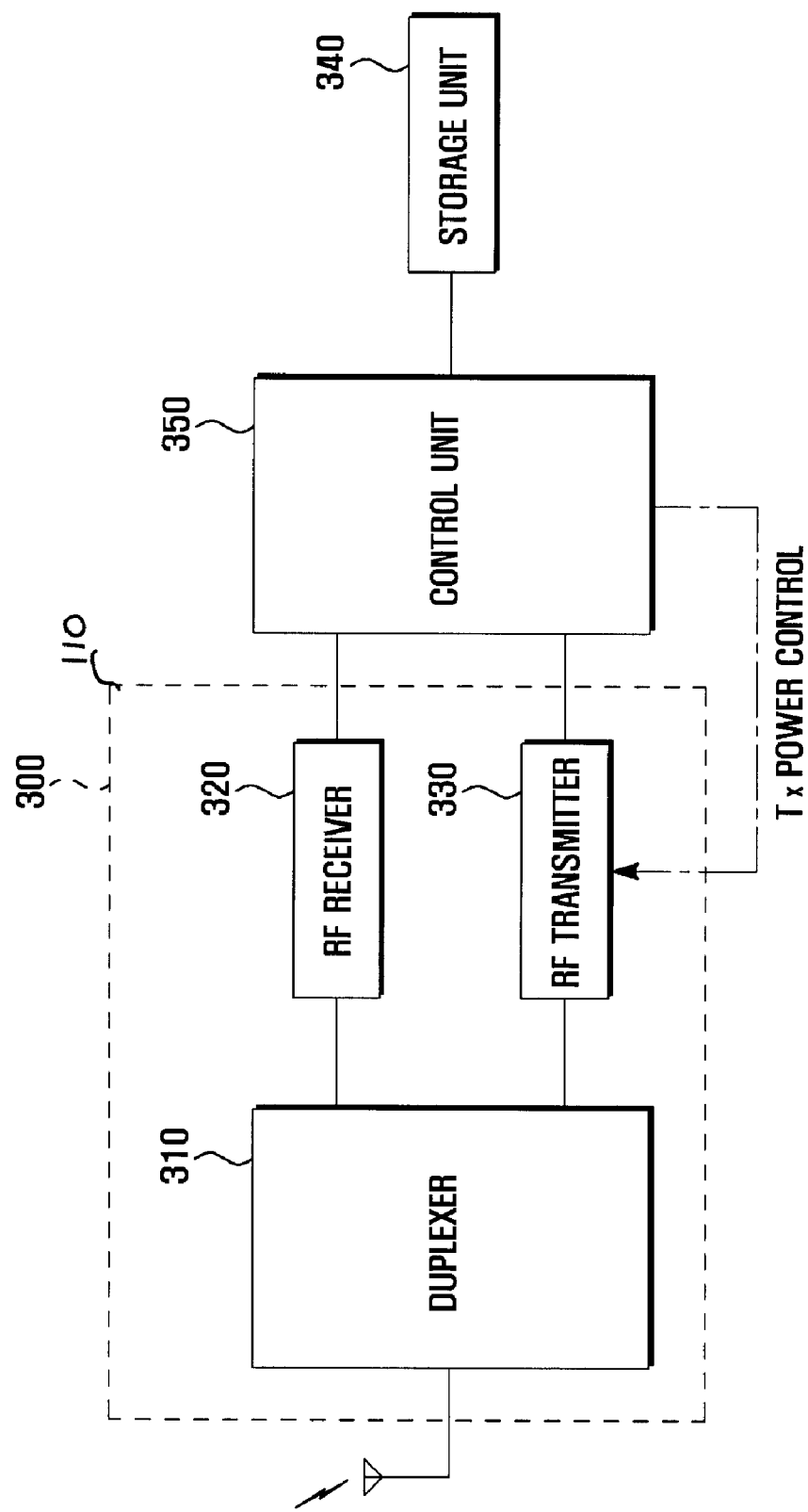
FIG. 3 is an exemplary block diagram illustrating a reference node in accordance with the principles of the present invention.

FIG. 3 is a block diagram illustrating an exemplary reference node 110 in accordance with the principles of the present invention. The reference node 110 includes, for example, an RF communication unit 300 including a duplexer 310, RF receiver 320 and RF transmitter 330, storage unit 340, and control unit 350.

The duplexer 310 is connected to an antenna, and separates the transmit and receive frequencies from each other to prevent interference. The RF receiver 320 low-noise amplifies a received signal and downconverts the frequency of the received signal, and the RF transmitter 330 upconverts the frequency of a signal to be transmitted and amplifies the signal.

Still referring to FIG. 3, the storage unit 340 stores programs and data necessary for the overall operation of the reference node 110. In particular, the storage unit 340 can store a program necessary for transmission range control. The storage unit 340 can further store a position location table.

The control unit 350 controls the overall operation of the reference node 110. In particular, the control unit 350 controls the RF transmitter 330 to send a position location table and information on node distance and maximum transmission distances by transmit power levels to the sensor node 120. The control unit 350 can send reference node information, which includes transmit power data and absolute coordinate data, to the sensor node 120 while varying transmission power according to the transmit power level related to location information of the reference node 110 (transmission range control).

In transmission range control, upon reception of a location information request signal from a sensor node 120, the reference node 110 successively sends reference node information to the sensor node 120 while varying transmission power using transmit power control. Transmission ranges of reference node information transmitted by a reference node 110 with varying transmit power levels can be represented, for example, by donut-shapes as shown in FIG. 2.

Figure 4:
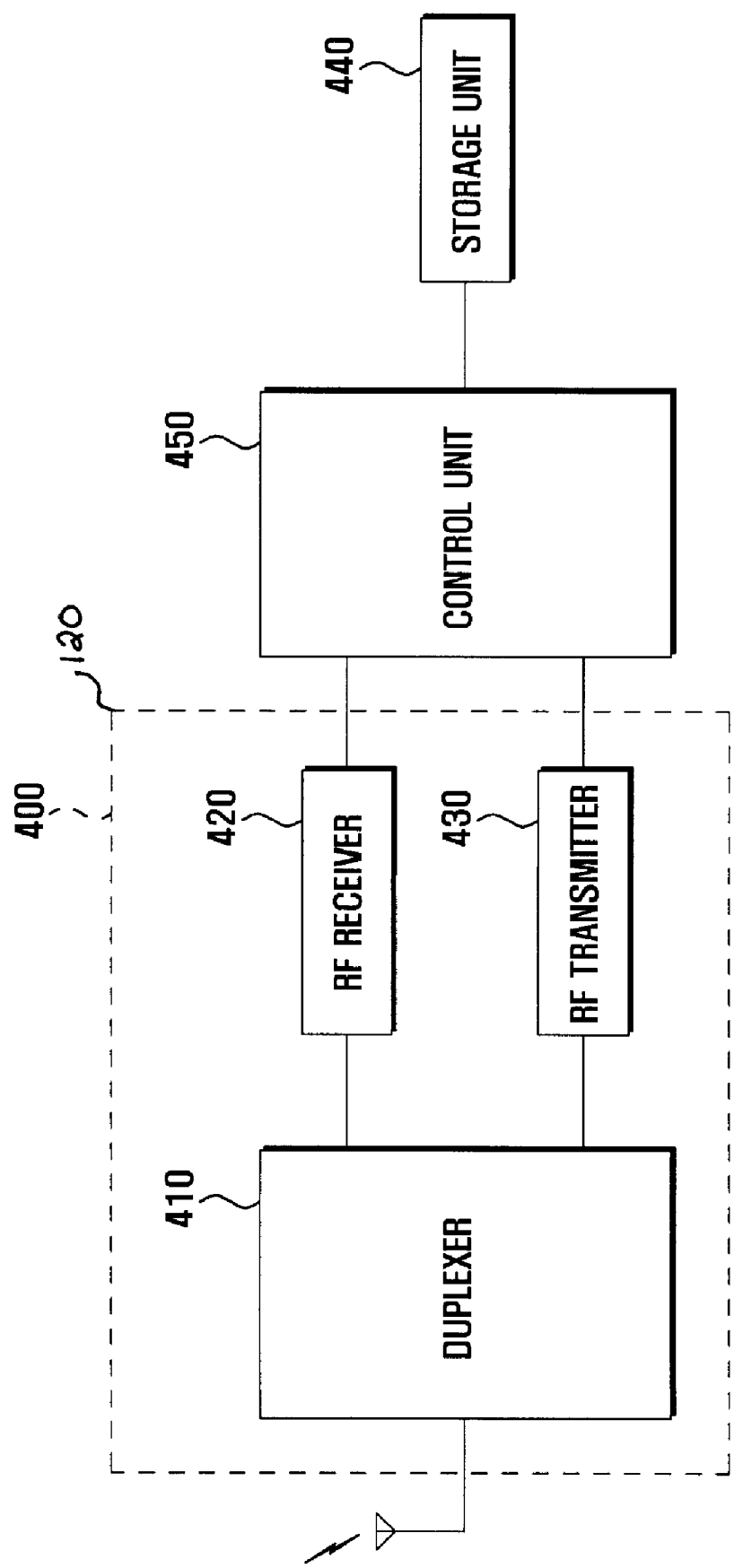
FIG. 4 is an exemplary block diagram illustrating a sensor node in accordance with the principles of the present invention.

FIG. 4 is a block diagram illustrating a sensor node 120 in accordance with the principles of the present invention. The sensor node 120 includes an RF communication unit 400 including a duplexer 410, RF receiver 420 and RF transmitter 430, storage unit 440, and control unit 450.

The duplexer 410 is connected to an antenna, and separates transmit and receive frequencies from each other to prevent interference. The RF receiver 420 low-noise amplifies a received signal and downconverts the frequency of the received signal, and the RF transmitter 430 upconverts the frequency of a signal to be transmitted and amplifies the signal.

The storage unit 440 stores programs and data necessary for the overall operation of the sensor node 120. In particular, the storage unit 440 can store a position location table received from a reference node 110.

The control unit 450 controls the overall operation of the sensor node 120. In particular, the control unit 450 controls the RF receiver 420 to receive a position location table from reference nodes 110. In succession, the control unit 450 controls the RF receiver 420 to receive information on node distance and maximum transmission distances by transmit power levels, and reference node information from plural reference nodes 110. After reception of the reference node information, the control unit 450 can readily be aware of the coordinates of the sensor node 120 using the position location table stored in the storage unit 440.

Figure 5:
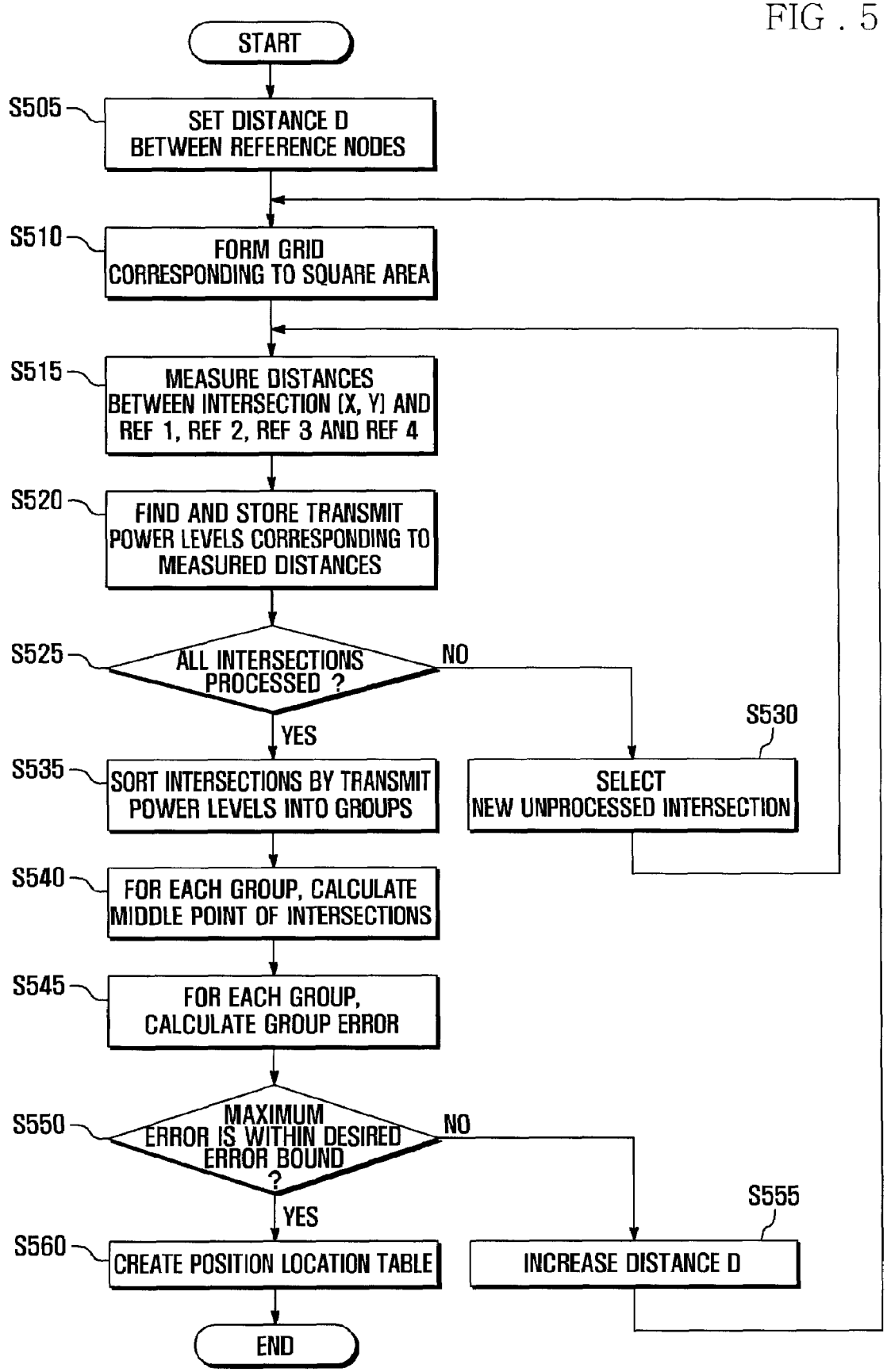
FIG. 5 is a flow chart illustrating examples of a procedure according to the present invention for determining an adequate distance between reference nodes and to create a position location table.

FIG. 5 is a flow chart illustrating a procedure to determine an adequate distance between reference nodes and to create a position location table.

The exemplary distance determining procedure of FIG. 5 can be executed by an external device other than a node (in the following description, a measuring instrument is assumed to perform this procedure to create a position location table). Reference nodes or sensor nodes may receive and utilize a position location table prepared by an external device for position locating. The position location table may be pre-stored in the reference nodes and sensor nodes. In an exemplary embodiment, the position location table is stored in reference nodes, and then transferred to sensor nodes. Further, it is assumed that nearby reference nodes are arranged to form a square. Four reference nodes corresponding to the vertices of a square are referred to as Ref 1, Ref 2, Ref 3 and Ref 4. The origin node, a reference node with the smallest absolute coordinates (x, y), is assumed to be Ref 1.

Referring to FIG. 5, by aiming for a desired error bound set by the user, a measuring instrument sets a distance d between reference nodes (S505). The measuring instrument then forms a grid of vertical and horizontal lines corresponding to a square area defined by plural reference nodes (S510). The vertical and horizontal lines form intersection points in the grid.

Figure 6:
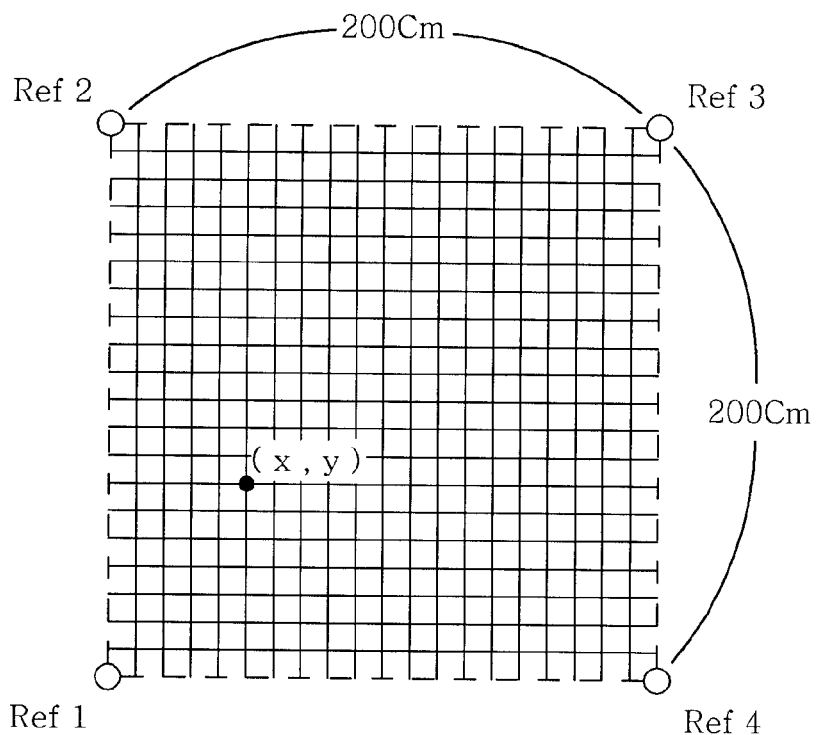
FIG. 6 illustrates a grid of vertical and horizontal lines corresponding to an area formed by plural reference nodes according to an exemplary aspect of the invention.

FIG. 6 illustrates a grid corresponding to an area formed by plural reference nodes. In FIG. 6, it is assumed that the reference nodes are arranged to form a square and the distance d between reference nodes is 200 cm. In the grid, it is assumed that the vertical lines are spaced 10 cm apart and horizontal lines are also spaced 10 cm apart. An intersection point in the grid can be represented by, for example, coordinates (x, y).

Now referring back to FIG. 5, the measuring instrument selects an intersection point in the grid and measures distances from the intersection point to four reference nodes Ref 1, Ref 2, Ref 3 and Ref 4 (S515). The measuring instrument finds transmit power levels corresponding to the measured distances using Table 1 (S520). For example, if the measured distance from the intersection point to the node Ref 1 is 20 cm, the corresponding transmit power level is level 2. Hence, for an intersection point in the grid, four transmit power levels are present in relation to nodes Ref 1, Ref 2, Ref 3 and Ref 4, and can be stored as an ordered quadruple.

Figure 7:
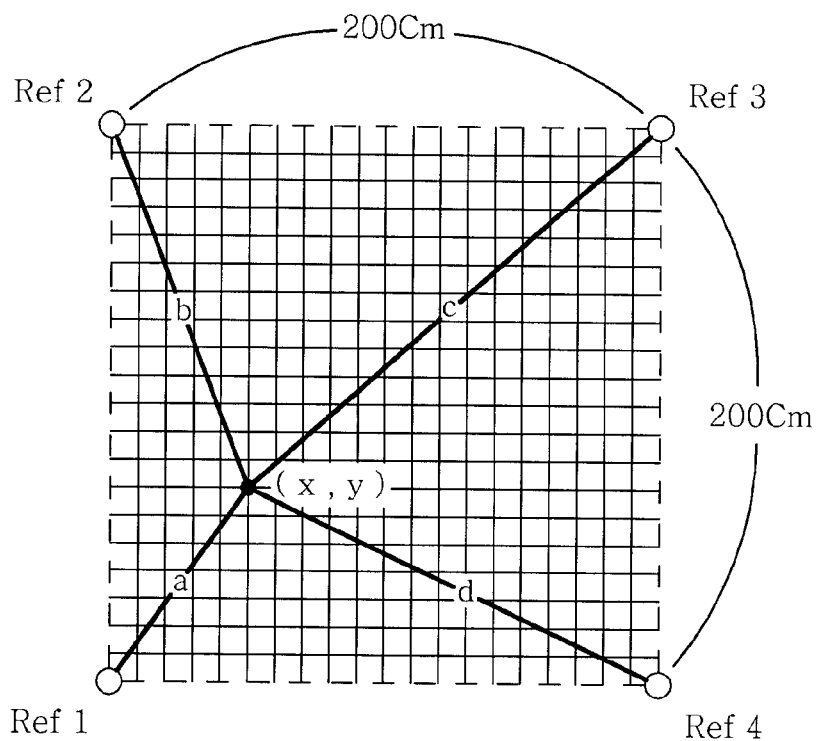
FIG. 7 illustrates measurement of distances according to an exemplary aspect of the invention between an intersection point (x, y) in the grid and reference nodes Ref 1, Ref 2, Ref 3 and Ref 4.

FIG. 7 illustrates an exemplary measurement of distances between an intersection point (x, y) in the grid and reference nodes Ref 1, Ref 2, Ref 3 and Ref 4. In the example shown in FIG. 7, distances between the intersection point (x, y) and reference nodes Ref 1, Ref 2, Ref 3 and Ref 4 are a, b, c and d, respectively. The measuring instrument finds transmit power levels corresponding to the measured distances using Table 1. For example, if a, b, c and d are 15 cm, 40 cm, 60 cm and 200 cm, respectively, the ordered quadruple corresponding to these distances becomes (1, 2, 2, 4).

Referring back to FIG. 5, the measuring instrument checks whether all intersection points in the grid are processed (S525). If all intersection points are not processed, the measuring instrument selects an unprocessed intersection point in the grid (S530) and returns to step S515.

However, if all intersection points are processed, the measuring instrument sorts the intersection points by transmit power level patterns into groups (S535). That is, those intersection points belonging to the same group have an identical ordered quadruple of transmit power levels. For example, referring to Table 1, all distances between 0 to 18 cm are mapped to transmit power level 1. Hence, many intersection points with different coordinates may be the same in terms of the transmit power level. Some intersection points with different distances to the reference nodes may have the same transmit power level pattern. Thereafter, for each group, the measuring instrument finds the middle point of those intersection points belonging to the group (S540). For each group, the measuring instrument calculates the group error, which is equal to the longest one of distances between the middle point and intersection points of the group (S545). The maximum error for the sensor node is the largest one of the group errors.

The measuring instrument checks whether the calculated maximum error is within the desired error bound (S550). If the calculated maximum error is not within the desired error bound, the measuring instrument increases the distance d between reference nodes (S555) and returns to step S510. If the calculated maximum error is within the desired error bound, the measuring instrument creates a position location table (S560). Table 2 illustrates a position location table.

TABLE 2

| | power level | | | | sensor | |
|---|---|---|---|---|---|---|
| | Ref 1 | Ref 2 | Ref 3 | Ref 4 | position | error |
| group 1 | level 1 | level 3 | level 3 | level 5 | (x1, y1) | E1 |
| group 2 | level 3 | level 1 | level 5 | level 3 | (x2, y2) | E2 |
| — | — | — | — | — | — | — |
| — | — | — | — | — | — | — |

For example, referring to Table 2, in the case where a sensor node at a particular position receives from the reference nodes Ref 1, Ref 2, Ref 3 and Ref 4 signals having transmit power levels 1, 3, 3 and 5, respectively, the position belongs to group 1, and the relative coordinates of the sensor node with reference to the origin node Ref 1 are given by (x1, y1). The coordinates of the sensor node are given by the sum of the absolute coordinates of the origin node Ref 1 and the relative coordinates (x1, y1). That is, the coordinates represents the sum of absolute coordinates and relative coordinate.

Figure 8:
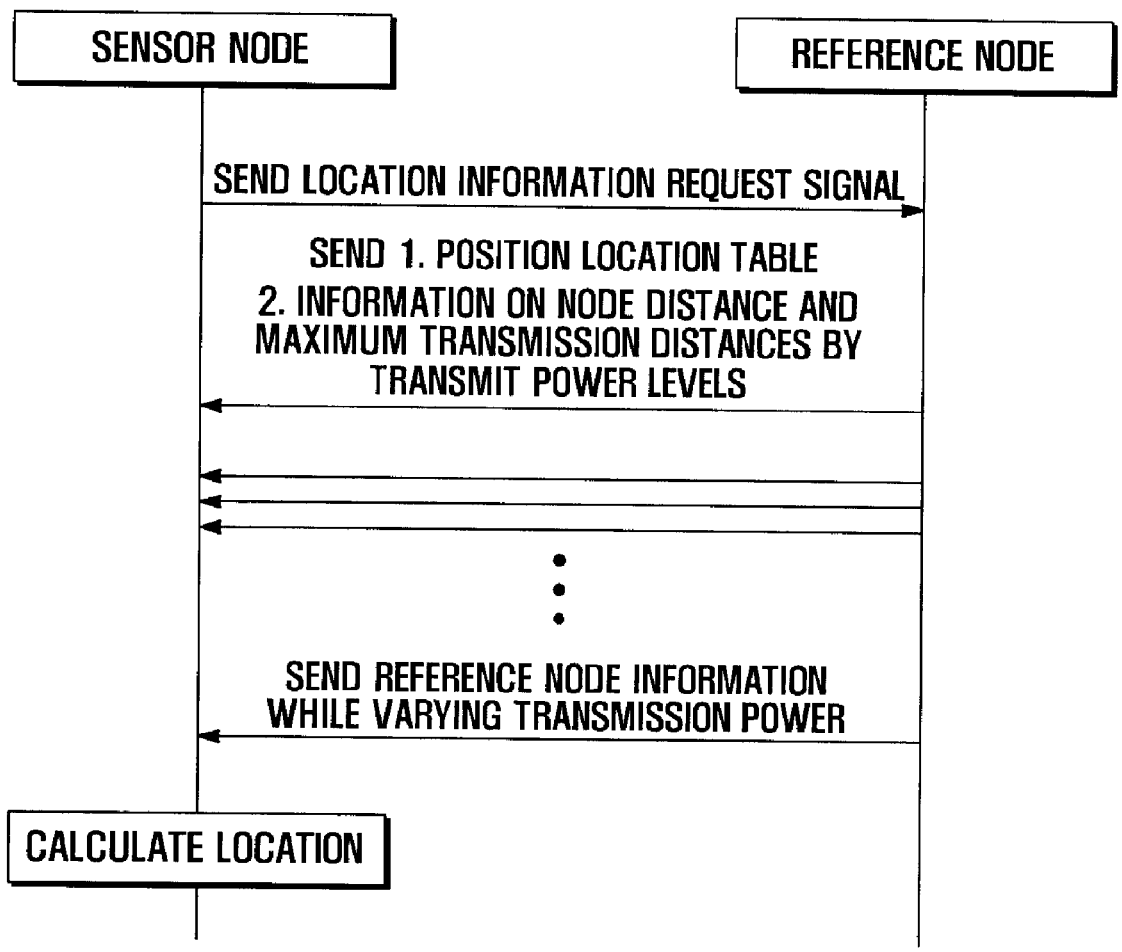
FIG. 8 is a sequence diagram according to an exemplary aspect of the invention illustrating interactions between a sensor node and reference nodes placed according to the determined distance to find the sensor node location in a position locating method according to another exemplary embodiment.

FIG. 8 is a sequence diagram illustrating interactions between a sensor node and reference nodes placed according to the determined distance to find the sensor node location in a position locating method according to another exemplary embodiment of the present invention.

Referring to FIG. 8, for position identification, the sensor node 120 sends a location information request signal to a reference node 110. In return, the reference node 110 sends a position location table, and information on node distance and maximum transmission distances by transmit power levels first to the sensor node 120, and then sends reference node information to the sensor node 120 while varying transmission power. The reference node information may include, for example, transmit power data and absolute coordinate data of the reference node 110. After reception of the information, the sensor node 120 can readily be aware of the coordinates of its position using the position location table.

Figure 9:
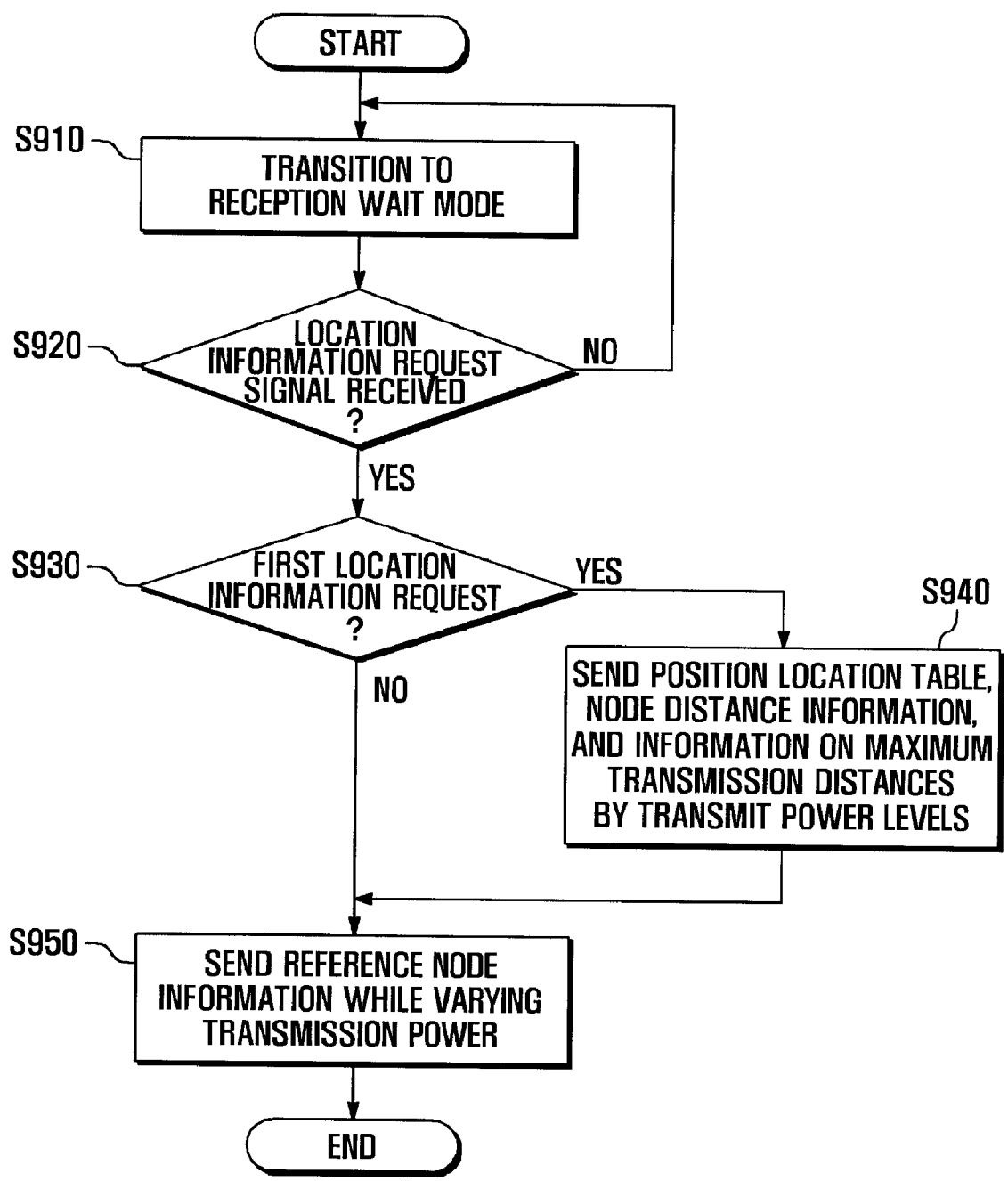
FIG. 9 is a flow chart illustrating an exemplary procedure according to an exemplary aspect of the invention performed by a reference node for receiving a location information request from a sensor node and for sending location information in the position locating method of FIG. 8.

FIG. 9 is a flow chart illustrating an exemplary procedure performed by a reference node 110 to receive a location information request from a sensor node 120 and to send location information in the position locating method of FIG. 8.

Referring to FIG. 9, the control unit 350 of the reference node 110 transitions to a reception wait mode to receive a location information request signal from a sensor node 120 (S910). When a location information request signal is received by the RF receiver 320 from a sensor node 120 (S920), the RF receiver 320 forwards the location information request signal to the control unit 350. The control unit 350 checks whether the location information request signal corresponds to the first request from the sensor node 120 (S930). If the location information request signal corresponds to the first request, the control unit 350 sends a position location table, node distance information, and information on maximum transmission distances by transmit power levels to the sensor node 120 (S940). The position location table, node distance information, and information on maximum transmission distances by transmit power levels are sent only for the first request.

The control unit 350 sends reference node information to the sensor node 120 while varying transmission power (S950). The reference node information may include transmit power data and absolute coordinate data of the reference node 110. At step S950, the control unit 350 can send a signal after a random backoff time expires, so as to avoid simultaneous signal transmission by multiple reference nodes.

Figure 10:
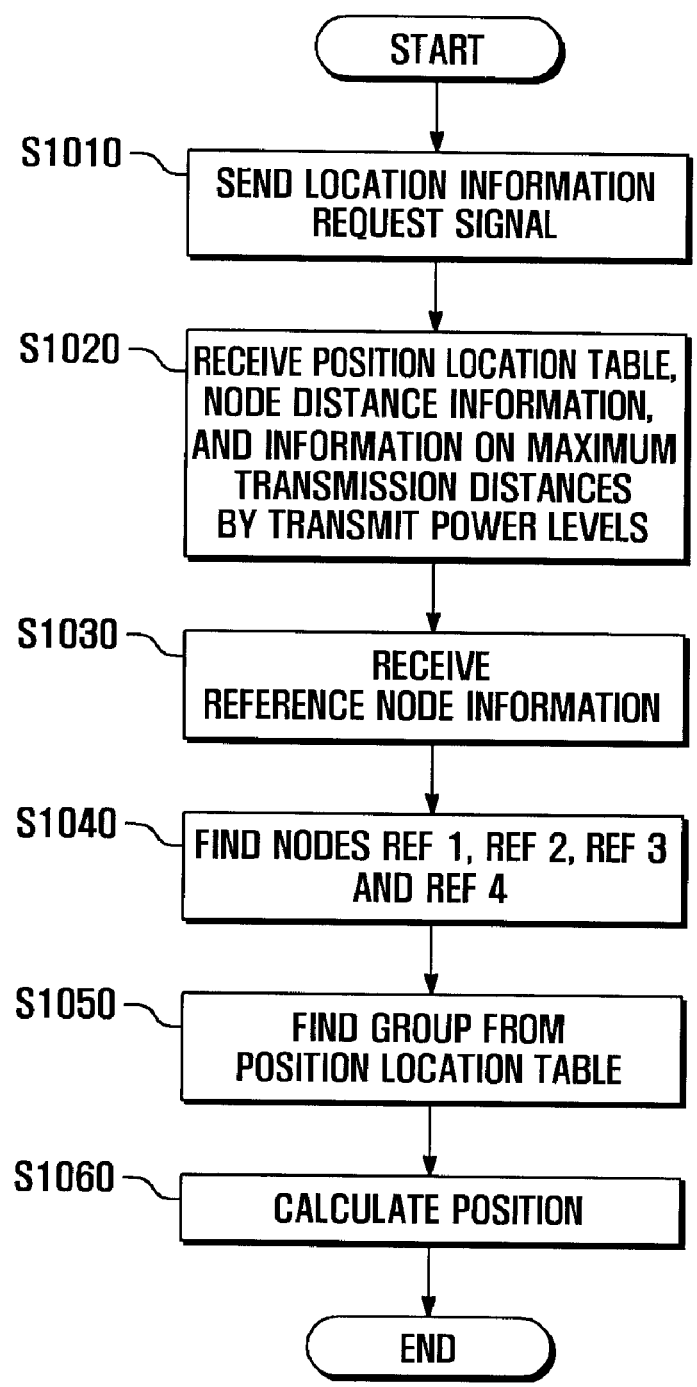
FIG. 10 is a flow chart illustrating an exemplary procedure performed by a sensor node to send a signal requesting location information to a reference node and to receive corresponding location information in the position locating method of FIG. 8.

FIG. 10 is a flow chart illustrating an exemplary procedure performed by a sensor node 120 to send a signal requesting location information to a reference node 110 and to receive corresponding location information in the position locating method of FIG. 8.

Referring now to FIG. 10, the control unit 450 of the sensor node 120 controls the RF transmitter 430 to send a location information request signal to reference nodes 110 (S1010). The control unit 450 receives through the RF receiver 420 a position location table, node distance information, and information on maximum transmission distances by transmit power levels from a reference node 110, and stores the received information in the storage unit 440 (S1020).

The position location table, node distance information, and information on maximum transmission distances by transmit power levels are sent only for the first request, and hence step S1020 can be skipped if the location information request signal does not correspond to the first request. Reception of the position location table, node distance information, and information on maximum transmission distances by transmit power levels is necessary once only for the first request, multiple signals carrying repeated information from multiple reference nodes 110 may be ignored except for the first signal. The control unit 450 receives through the RF receiver 420 reference node information sent by multiple reference nodes 110 with varying transmission power (S1030). The reference node information may include transmit power data and absolute coordinate data of the reference nodes 110.

Using multiple received signals carrying the reference node information, the control unit 450 finds four nearby reference nodes Ref 1, Ref 2, Ref 3 and Ref 4 forming a square shape (S1040). At this step, the control unit 450 can determine whether a received signal is from a nearby reference node 110 or distant reference node 110, using the distance between reference nodes and transmit power level patterns. The control unit 450 considers only the nearest four reference nodes 110. In addition, the control unit 450 sets the origin node Ref 1 to one of the four reference nodes having the smallest absolute coordinates (x, y). The control unit 450 extracts transmit power levels from the reference node information of the reference nodes Ref 1, Ref 2, Ref 3 and Ref 4 and compares the extracted transmit power levels with the position location table to find a corresponding group (S1050). The control unit 450 extracts the coordinates of the sensor position corresponding to the found group from the position location table, and adds the coordinates of the sensor position to the coordinates of the absolute position of the origin node Ref 1 to produce the position of the sensor node 120 (S1060). Accordingly, the sensor node 120 can readily obtain its position by checking transmit power levels of the reference nodes Ref 1, Ref 2, Ref 3 and Ref 4.

In particular, a sensor node can be moved from the current square area to a next square area. In such a case, the transmit power level present in a received signal from the reference node Ref 1 becomes higher than that corresponding to the distance between reference nodes. The control unit 450 of the sensor node can detect movement on the basis of a change in the transmit power level of the reference node Ref, and select a new origin node using the absolute coordinates of the reference nodes.

In the position locating method shown in the examples of FIGS. 8 to 10, a sensor node uses a position location table received from a reference node to find/obtain its position. The sensor node may also be made aware of its position without requesting transmission of a position location table.

Figure 11:
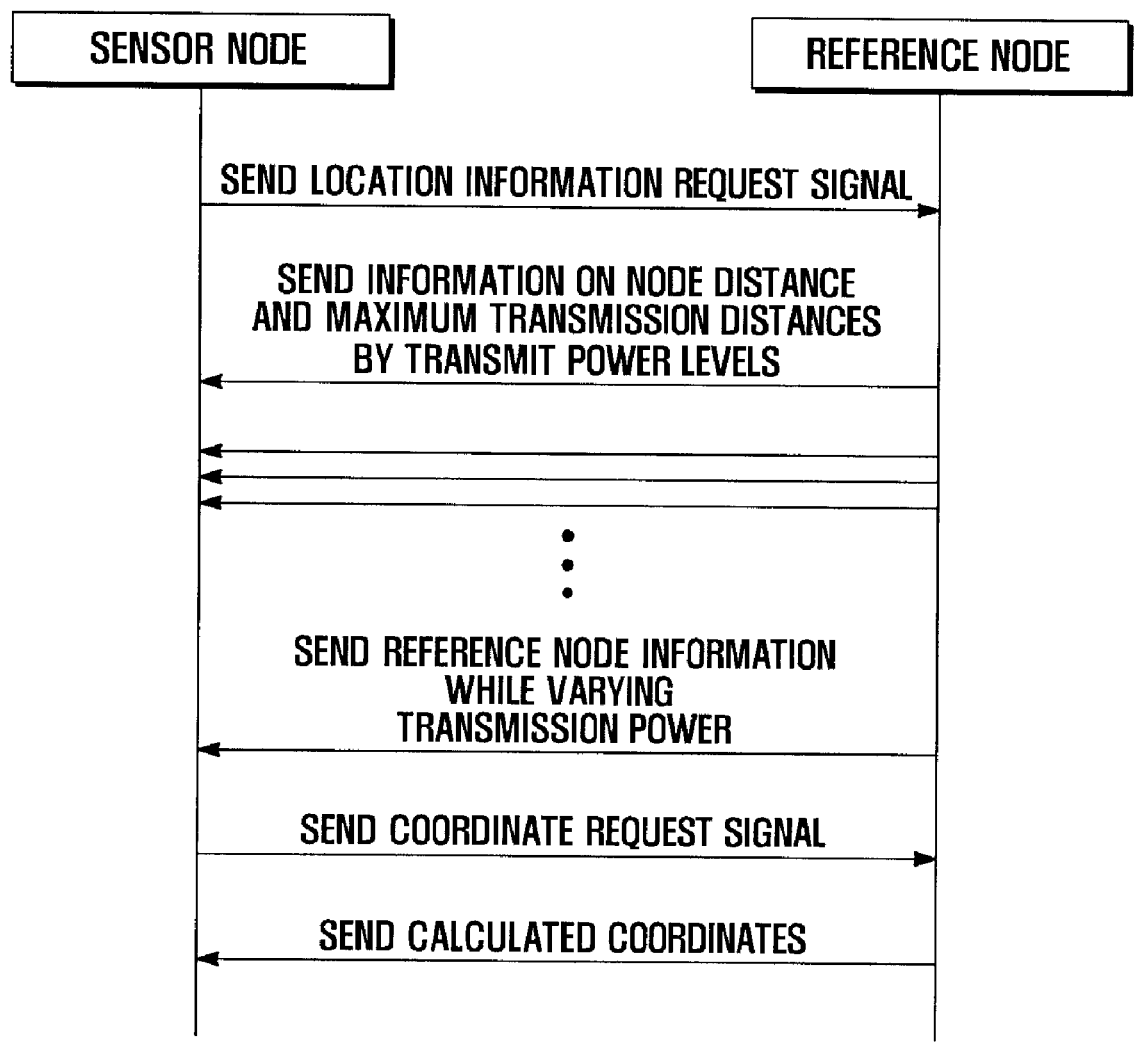
FIG. 11 is a sequence diagram illustrating interactions between a sensor node and reference nodes to find the sensor node location in a position locating method without requesting a position location table according to another exemplary embodiment of the present invention.

FIG. 11 is a sequence diagram illustrating interactions between a sensor node 120 and reference node 110 to find the sensor node location in a position locating method without requesting a position location table according to another exemplary embodiment of the present invention.

Referring now to FIG. 11, for position identification, the sensor node 120 sends a location information request signal to the reference nodes 110. In return, each reference node 110 sends information on node distance and maximum transmission distances by transmit power levels first to the sensor node 120, and then sends reference node information to the sensor node 120 while varying transmission power. The reference node information may include transmit power data and absolute coordinate data of the reference node 110. Unlike the position locating method of FIG. 8, a position location table is not sent. The position location table is voluminous, and omitting transmission thereof can be beneficial to error prevention in the network. The sensor node 120 sends to the reference node 110 a coordinate request signal carrying information on transmit power levels collected from signals of multiple reference nodes 110. Upon reception of the coordinate request signal, the reference node 110 calculates the coordinates of the location of the sensor node 120 using the position location table, and sends the calculated coordinates to the sensor node 120.

Figure 12:
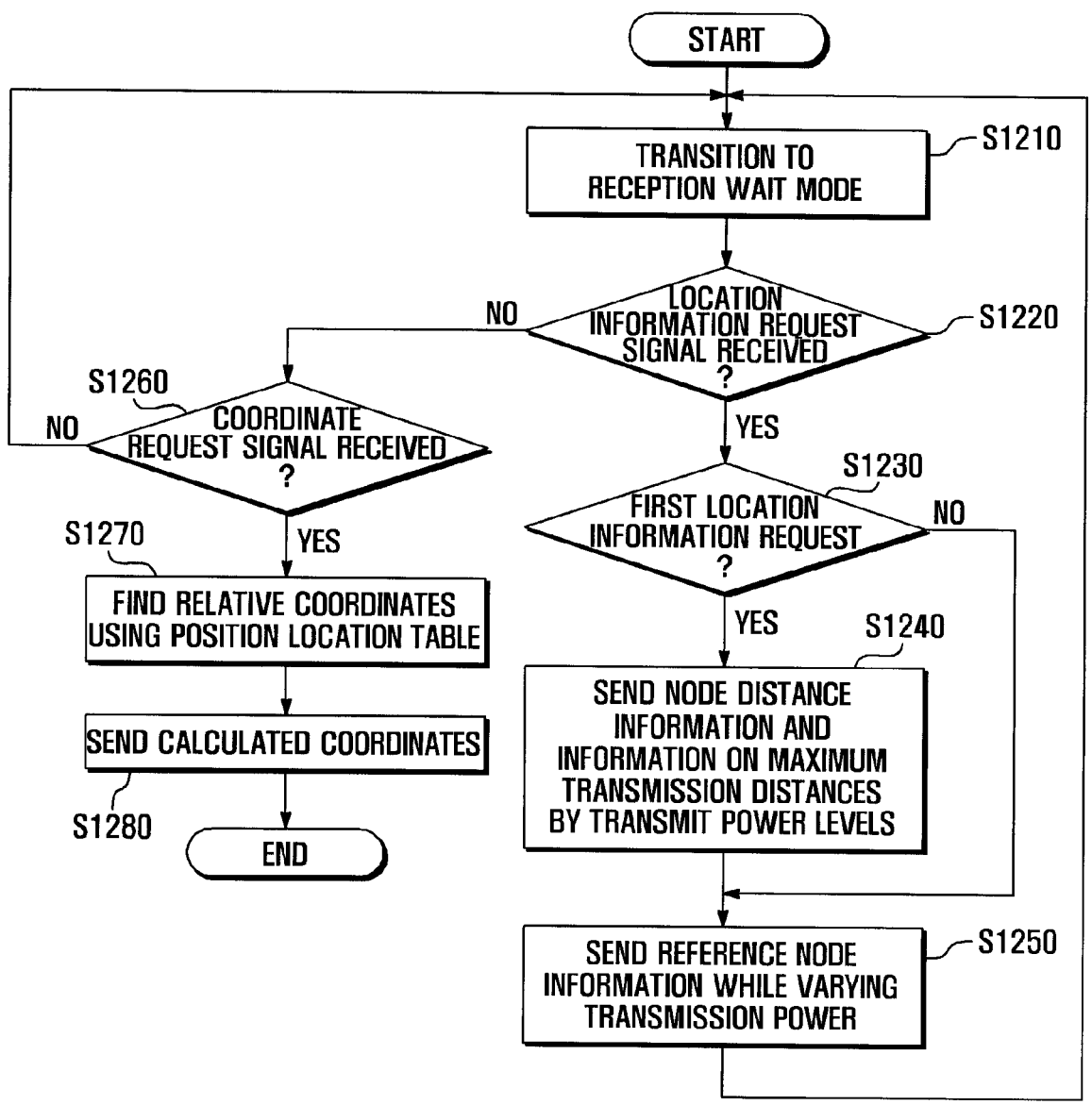
FIG. 12 is a flow chart illustrating an exemplary procedure performed by a reference node for receiving a location information request signal and a coordinate request signal from a sensor node and for sending coordinates of the sensor node location in the position locating method of FIG. 11.

FIG. 12 is a flow chart illustrating an exemplary procedure performed by a reference node 110 to receive a location information request signal and a coordinate request signal from a sensor node 120 and to send coordinates of the sensor node location in the position locating method of FIG. 11.

Referring now to FIG. 12, the control unit 350 of the reference node 110 transitions to a reception wait mode to receive a location information request signal or coordinate request signal from a sensor node 120 (S1210). When a signal is received by the RF receiver 320 from the sensor node 120, the RF receiver typically 320 forwards the received signal to the control unit 350, which then checks whether the received signal is a location information request signal (S1220). If the received signal is a location information request signal, the control unit 350 checks whether the location information request signal corresponds to the first request from the sensor node 120 (S1230). If the location information request signal corresponds to the first request, the control unit 350 sends node distance information and information on maximum transmission distances by transmit power levels to the sensor node 120 (S1240). The node distance information and information on maximum transmission distances by transmit power levels are sent only for the first request. The control unit 350 sends reference node information to the sensor node 120 while varying transmission power (S1250). The reference node information may include transmit power data and absolute coordinate data of the reference node 110. At step S1250, the control unit 350 can send a signal after a random backoff time expires, to avoid simultaneous signal transmission by multiple reference nodes.

Still referring to FIG. 12, if the received signal is not a location information request signal at step S1220, the control unit 350 checks whether the received signal is a coordinate request signal (S1260). If the received signal is a coordinate request signal, the control unit 350 extracts information on transmit power levels of multiple reference nodes from the coordinate request signal, and finds relative coordinates of the sensor node 120 using the position location table (S1270). The control unit 350 adds the absolute coordinates of the reference node 110 and found relative coordinates of the sensor node 120 together to produce the coordinates of the location of the sensor node 120, and sends the produced coordinates to the sensor node 120 (1280).

Figure 13:
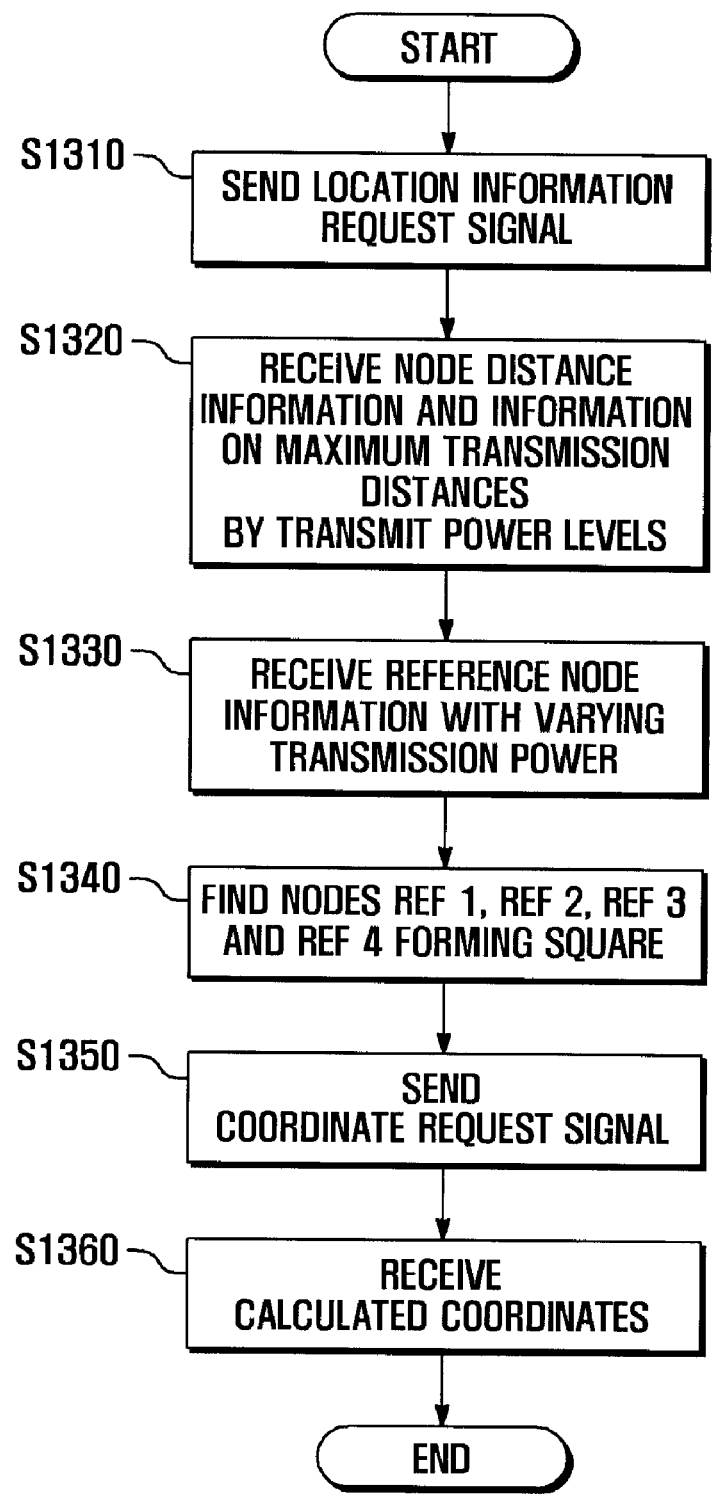
FIG. 13 is a flow chart illustrating a procedure performed by a sensor node to find the location thereof in the position locating method of FIG. 11.

FIG. 13 is a flow chart illustrating an exemplary procedure performed by a sensor node 120 to find the location thereof in the position locating method of FIG. 11.

Referring now to FIG. 13, the control unit 450 of the sensor node 120 controls the RF transmitter 430 to send a location information request signal to reference nodes 110 (S1310). The control unit 450 receives through the RF receiver 420 node distance information and information on maximum transmission distances by transmit power levels from a reference node 110 (S1320). Unlike the case in the exemplary procedure of FIG. 10, a position location table is not sent at step S1320. The position location table is voluminous, and omitting the transmission thereof can be beneficial to error prevention in the network. In other words, the information signal at step S1320 is sent only for the first request, and hence step S1320 can be skipped if the location information request signal does not correspond to the first request. The information signal at step S1320 is necessary once only for the first request, and hence multiple signals carrying repeated information from multiple reference nodes 110 may be ignored except for the first signal. Thereafter, the control unit 450 receives through the RF receiver 420 reference node information sent by multiple reference nodes 110 with varying transmission power (S1330). The reference node information may include transmit power data and absolute coordinate data of the reference nodes 110. Using multiple received signals carrying the reference node information, the control unit 450 finds four nearby reference nodes Ref 1, Ref 2, Ref 3 and Ref 4 forming a square shape (S1340). At step S1340, the control unit 450 can determine whether a received signal is from a nearby reference node 110 or from a distant reference node 110, using the distance between reference nodes and transmit power level patterns. The control unit 450 considers only the nearest four reference nodes 110. In addition, the control unit 450 sets the origin node Ref 1 to one of the four reference nodes having the smallest absolute coordinates (x, y). Thereafter, the control unit 450 controls the RF transmitter 430 to send a coordinate request signal carrying information on transmit power levels of the reference nodes Ref 1, Ref 2, Ref 3 and Ref 4 to the reference node 110 (S1350). The control unit 450 then receives calculated coordinates from the reference node 110, being made aware of the position of the sensor node 120 (S1360).

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A position locating system for a sensor network, comprising:
   a plurality of reference nodes, each reference node of said plurality of reference nodes having self-positional information regarding a respective position thereof; and
   a sensor node having a position location table,
   wherein each reference node comprises:
      a control unit for generating, in response to a location information request signal, a location information; and
      a radio frequency (RF) communication unit for receiving a location information request signal and for forwarding the received location information request signal to the control unit, controlling transmission power, and sending the generated location information in return,
   wherein the sensor node comprises:
      a control unit for generating a coordinate request signal, analyzing transmit power levels extracted from location information from reference nodes, and for calculating coordinates of a position of the sensor node using the position location table; and
      an RF communication unit for transmitting the coordinate request signal, and for receiving location information and forwarding the location information to the control unit,
   wherein the position location table is formed by providing a grid of a preset number of vertical and horizontal lines corresponding to a square area defined by an arrangement of the plurality of reference nodes;
   wherein measured distances from each intersection point in the grid to each of the reference nodes, respectively correspond to transmit power levels;
   wherein intersection points sorted according to transmit power level patterns are arranged into sorted groups in which each particular group has a middle point of those intersection points belonging to the particular group; and
   error calculating means for calculating errors for all groups to determine whether a largest group error is within a desired error boundary.

2. The position locating system of claim 1, wherein when the largest group error is not within the desired error boundary, a distance between reference nodes is increased for repeated execution.

3. The position locating system of claim 1, wherein the reference nodes are arranged to form a square.

4. The position locating system of claim 1, wherein the error of a particular group is equal to a longest one of distances between the middle point of the group and intersection points belonging to the particular group.

5. The position locating system of claim 1, wherein the location information comprises:
   a node distance from each reference node to the sensor node and maximum transmission distances by transmit power levels; and
   reference node data including transmit power data and absolute coordinate data.

6. The position locating system of claim 1, wherein the control unit of the sensor node finds four nearest reference nodes forming a square on the basis of location information from multiple reference nodes.

7. The position locating system of claim 6, wherein the control unit of the sensor node is configured for finding a group in the position location table that corresponds to transmit power levels of a four nearest reference nodes, and said sensor node is configured for obtaining its own coordinates by adding together coordinates of a sensor position corresponding to the group found in the position location table and absolute coordinates of one of the four nearest reference nodes having a smallest absolute coordinate value (x, y).

8. The position locating system of claim 7, wherein the control unit of a reference node controls a transmission operation to send information regarding a node distance from each reference node to the sensor node and maximum transmission distances by transmit power levels and reference node information when a random backoff time expires after reception of a location information request signal.

9. The position locating system of claim 1, wherein said sensor node receives the position location table from a particular reference node of the plurality of reference nodes.

10. A position locating method for a sensor network having reference nodes and at least one sensor node, comprising:
   transmitting, by the sensor node, a location information request signal;
   transmitting, by each of neighbor reference nodes in response to reception of the location information request signal, a position location table, information on a node distance from each reference node to the sensor node and maximum transmission distances by transmit power levels, and transmitting transmit power data and absolute coordinate data while valving transmission power; and
calculating, by the sensor node, a location of the sensor node using the position location table and transmit power levels of the reference nodes,
   wherein the position location table is created using a procedure comprising:
      forming a grid of a preset number of vertical and horizontal lines corresponding to a square area defined by plural reference nodes;
      measuring distances from each intersection point in the grid to the reference nodes, and finding transmit power levels corresponding to the measured distances;
      sorting intersection points according to transmit power level patterns into groups, and finding, for each group, a middle point of those intersection points belonging to the group; and
      calculating errors for all groups, and checking whether the largest group error is within a desired error bound.

11. The position locating method according to claim 10, wherein the procedure further comprises increasing, when the largest group error is not within the desired error bound, a distance between reference nodes for repeated execution of the procedure.

12. The position locating method of claim 10, wherein calculating, by the sensor node, a location of the sensor node comprises:
   finding a group in the position location table corresponding to transmit power levels of the reference nodes; and adding coordinates of a sensor position corresponding to the found group and absolute coordinates of one of the reference nodes having the smallest absolute coordinates (x, y) together.

13. The position locating method of claim 12, wherein the reference nodes are arranged to form a square.

14. A position locating system for a sensor network, comprising:
a plurality of reference nodes, each reference node including self-positional information of a position thereof and having a position location table; and
a sensor node,
wherein each reference node comprises:
a control unit for generating, in response to a location information request signal from the sensor node, location information, and for calculating, in response to a coordinate request signal from the sensor node, coordinates of a position of the sensor node; and
a radio frequency (RF) communication unit for receiving a location information request signal or a coordinate request signal from the sensor node and forwarding the received signal to the control unit, controlling transmission power, for sending the generated location information in return for the location information request signal, and for sending the coordinates of the position of the sensor node in return for the coordinate request signal,
wherein the sensor node comprises:
a control unit for generating a location information signal or a coordinate request signal; and
an RF communication unit for transmitting the location information signal or coordinate request signal, and for receiving location information and forwarding the location information to the control unit,
wherein the position location table is formed by providing a grid of a preset number of vertical and horizontal lines corresponding to a square area defined by an arrangement of plural reference nodes;
wherein measured distances from each intersection point in the grid to each of the reference nodes, respectively correspond to transmit power levels;
wherein intersection points are sorted according to transmit power level patterns and are arranged into groups, in which each particular group has a middle point of those intersection points belonging to the particular group; and
error calculating means for calculating errors for all groups to determine whether a largest group error is within a desired error boundary.

15. The position locating system of claim 14, when the largest group error is not within the desired error boundary, a distance between reference nodes is increased for repeated execution.

16. The position locating system of claim 14 wherein the reference nodes are arranged to form a square.

17. The position locating system of claim 14, wherein the error of a group is equal to the longest one of distances between the middle point of the group and intersection points belonging to the group.

18. The position locating system of claim 14, wherein the location information comprises:

a node distance from each reference node to the sensor node and maximum transmission distances by transmit power levels; and
reference node information including transmit power data and absolute coordinate data.

19. The position locating system of claim 18, wherein the control unit of each reference node finds four nearest reference nodes forming a square on the basis of location information from multiple reference nodes.

20. The position locating system of claim 19, wherein the control unit of each reference node finds a group in the position location table corresponding to transmit power levels of the four nearest reference nodes, and obtains its own coordinates by adding coordinates of a sensor position corresponding to the found group and absolute coordinates of one of the four reference nodes having the smallest absolute coordinates (x, y) together.

21. A position locating method for a sensor network having reference nodes and at least one sensor node, comprising:
transmitting, by the sensor nod; a location information request signal;
transmitting, by each of neighbor reference nodes in response to reception of the location information request signal, information on a node distance from each reference node to the sensor node and maximum transmission distances by transmit power levels, and transmitting transmit power data and absolute coordinate data while varying transmission power
transmitting, by the sensor node, a coordinate request signal carrying information on transmit power levels of the reference nodes; and
calculating, by a reference node receiving the coordinate request signal, a location of the sensor node using the transmit power levels of the reference nodes and a position location table, and sending coordinates of the calculated location,
wherein the position location table is created using a procedure comprising:
forming a grid of a preset number of vertical and horizontal lines corresponding to a square area defined by plural reference nodes;
measuring distances from each intersection point in the grid to the reference nodes, and finding transmit power levels corresponding to the measured distances;
sorting intersection points by according to transmit power level patterns into groups, and finding, for each group, a middle point of those intersection points belonging to the group; and
calculating errors for all groups, and checking whether the largest error is within a desired error bound.

22. The position locating method of claim 21, wherein calculating, by a reference node, a location of the sensor node comprises:
finding a group in the position location table corresponding to transmit power levels of the reference nodes; and
adding coordinates of a sensor position corresponding to the found group and absolute coordinates of one of the reference nodes having the smallest absolute coordinates (x, y) together.

23. The position locating method of claim 21, wherein the reference nodes are arranged to form a square.

* * * * *